(12) United States Patent
Chen (10) Patent No.: US 9,467,403 B2
(45) Date of Patent: Oct. 11, 2016

(54) METHOD AND MOBILE TERMINAL FOR SPEECH COMMUNICATION

(71) Applicant: Tencent Technology (Shenzhen) Company Limited, Shenzhen (CN)

(72) Inventor: Zhiqiang Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/446,250

(22) Filed: Jul. 29, 2014

(65) Prior Publication Data

US 2015/0148011 A1 May 28, 2015

Related U.S. Application Data

(63) Continuation of application No. PCT/CN2014/078514, filed on May 27, 2014.

(30) Foreign Application Priority Data

Nov. 28, 2013 (CN) .......................... 2013 1 0625877

(51) Int. Cl.
*H04M 1/663* (2006.01)
*H04L 12/58* (2006.01)
*H04W 4/12* (2009.01)

(52) U.S. Cl.
CPC ................ *H04L 51/04* (2013.01); *H04W 4/12* (2013.01); *H04L 51/38* (2013.01)

(58) Field of Classification Search
CPC ....... H04M 1/60; H04M 1/725; G06F 17/30; G06F 3/16; G06F 3/0487; H04L 12/58; H04W 4/12; H04W 4/14

USPC ........... 455/466, 412.2, 412.1, 563; 709/206, 709/207; 704/258
See application file for complete search history.

(56) References Cited

U.S. PATENT DOCUMENTS

| | | | |
|---|---|---|---|
| 7,996,463 B2* | 8/2011 | Mousseau et al. | ........... 709/204 |
| 8,073,429 B2* | 12/2011 | Karaoguz | ....... H04M 1/274575 |
| | | | 370/312 |

(Continued)

FOREIGN PATENT DOCUMENTS

| CN | 1378155 A | 11/2002 |
|---|---|---|
| CN | 102111490 A | 6/2011 |

(Continued)

OTHER PUBLICATIONS

Tencent Technology, ISR, PCT/CN2014/078514. Sep. 3, 2014, 2 pgs.

*Primary Examiner* — Allahyar Kasraian
*Assistant Examiner* — B. M. M Hannan
(74) *Attorney, Agent, or Firm* — Morgan, Lewis & Bockius LLP (57) ABSTRACT

Method and device of providing multi-modal instant messaging communication are disclosed. The method includes: while displaying a conversation interface of a current dialog session between a user of the mobile device and the user's conversation partner: detecting a change in a manner by which the mobile device is carried by the user; in response to detecting the change: obtaining a current conversation status of the current dialog session; and in accordance with predetermined rules based on the current conversation status and the detected change, selectively activating a respective conversation mode of a plurality of conversation modes available to the current dialog session; processing a message under the activated respective conversation mode; and updating the current conversation status of the current dialog session.

20 Claims, 4 Drawing Sheets

(56) References Cited

U.S. PATENT DOCUMENTS

| | | | | |
|---|---|---|---|---|
| 8,326,271 | B2 * | 12/2012 | Satake | H04L 12/1859 379/93.17 |
| 8,417,223 | B1 * | 4/2013 | Trivi | H04M 3/53366 455/412.1 |
| 8,548,433 | B1 * | 10/2013 | Othmer | H04W 4/00 379/67.1 |
| 8,688,150 | B2 * | 4/2014 | Mumick | H04W 4/12 348/14.01 |
| 8,706,162 | B1 * | 4/2014 | Abrahamsson et al. | 455/556.1 |
| 8,996,059 | B2 * | 3/2015 | Mumick | H04M 1/7255 455/412.1 |
| 2007/0280432 | A1 * | 12/2007 | Richardson | G10L 25/78 379/67.1 |
| 2009/0164219 | A1 * | 6/2009 | Yeung | G04C 3/002 704/258 |
| 2010/0083182 | A1 * | 4/2010 | Liu et al. | 715/843 |
| 2012/0245935 | A1 * | 9/2012 | Wong et al. | 704/235 |
| 2013/0012170 | A1 * | 1/2013 | Othmer | H04W 76/005 455/412.1 |
| 2013/0288655 | A1 * | 10/2013 | Foruntanpour et al. | 455/418 |
| 2013/0316679 | A1 * | 11/2013 | Miller et al. | 455/412.1 |
| 2014/0018050 | A1 * | 1/2014 | Isidore | 455/414.1 |
| 2014/0194102 | A1 * | 7/2014 | Strazisar et al. | 455/418 |
| 2015/0038121 | A1 * | 2/2015 | Koum et al. | 455/412.2 |

FOREIGN PATENT DOCUMENTS

| | | |
|---|---|---|
| CN | 102609091 A | 7/2012 |
| CN | 102682135 A | 9/2012 |
| CN | 103049194 A | 4/2013 |
| CN | 103259926 A | 8/2013 |
| CN | 103384288 A | 11/2013 |

* cited by examiner

METHOD AND MOBILE TERMINAL FOR SPEECH COMMUNICATION

RELATED APPLICATIONS

This application is a continuation application of PCT Patent Application No. PCT/CN2014/078514, entitled "A Method and Mobile Terminal for Speech Communication" filed on May 27, 2014, which claims priority to Chinese Patent Application No. 201310625877.5, entitled "A METHOD AND MOBILE TERMINAL FOR SPEECH COMMUNICATION," filed on Nov. 28, 2013, both of which are incorporated by reference in their entirety.

TECHNICAL FIELD

The present application relates to the Internet technical field, especially relates to a method and mobile terminal for an instant messaging (IM) communication, especially speech communication.

BACKGROUND

At present, many mobile terminals provide speech communication in instant messaging applications. Moreover, all mobile terminals need the users to conduct a specific touch operation or key pushing operation on the mobile terminal before providing the speech communication. For example, in case of speech message recording, a user needs to continually press and hold a button during the recording process. When playing a recorded voice message, a user needs to touch a key or push a button before the recorded voice message is played back. An instant messaging (IM) communication session often lasts a long time, and the user may conduct the recording and playing actions many times. Therefore, the user has to repeat multiple operations and many of these operations also take a long time to perform each time. The user has to perform multiple tasks including providing instructions and communication information to the mobile device via reading, speaking, listening, searching, and touch actions. As a result, the operation process of using speech communication on the mobile terminal at present is relatively complex and involves tedious repetitions.

Therefore, it is desirable to have a method that simplifies the interaction between a user and the mobile device. Also, it is desirable to have a mobile device that is configured to judge the intent of the user and thus reduce the complexity of intended operations.

SUMMARY

In accordance with some embodiments, a method of providing multi-modal instant messaging communication is performed at a mobile device having one or more processors and memory for storing one or more programs to be executed by the one or more processors. The method comprises: while displaying a conversation interface of a current dialogue session between a user of the mobile device and the user's conversation partner: detecting a change in a manner by which the mobile device is carried by the user; in response to detecting the change: obtaining a current conversation status of the current dialogue session; and in accordance with predetermined rules based on the current conversation status and the detected change, selectively activating a respective conversation mode of a plurality of conversation modes available to the current dialogue session; processing a message under the activated respective conversation mode; and updating the current conversation status of the current dialogue session.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In accordance with embodiments provided herein, a mobile terminal may be any mobile terminals with a communication function, such as a cellular phone, a smartphone, a smart-watch, a tablet PC, a gaming device, a smart camera, and an intelligent audio and video players, etc. In some embodiments, the mobile terminal includes a touch screen for displaying a user interface and receiving touch inputs from the user. In some embodiments, the mobile terminal includes various sensors and peripheral devices for detecting the orientation, movement (e.g., speed, acceleration, position, etc.), ambient environment (e.g., temperature, lights, pressure, etc.) of the mobile terminal.

In addition, in some embodiments, the mobile terminal provides a multi-modal communication function that sends and receives messages in various modalities, including text messages, recorded voice messages, picture messages, real-time voice and/or video communications, etc. In some embodiments, the voice messages or streamed voice data are optionally provided to the user using a speaker-based mode, or an earpiece-based mode. In some embodiments, text messages may be entered using a typing input mode or a dictation mode. In some embodiments, text messages may be provided to the user as text using a text output mode or as speech using a text-to-speech mode. Among the various modes of the multi-modal communication, speech communication in accordance with some embodiments may include at least one of the following functions: speech playing (including playing back a voice message), speech recording (including recording a voice message) and continuous conversation (e.g., streaming voice communication).

In some embodiments, multi-modal communication (e.g., speech communication) can be provided between two or more communication accounts established with a communication server. In some embodiments, communication accounts are identified by their IM communication account identifiers, phone numbers, email addresses, etc. An account is used for identifying a communication user.

Figure 1:
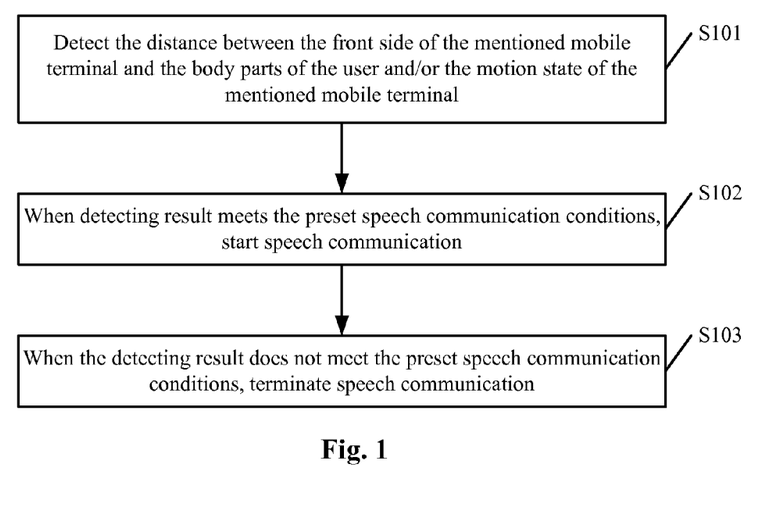
FIG. 1 is a flowchart of providing multi-modal instant messaging communication in accordance with some embodiments.

FIG. 1 is a schematic flow diagram of multi-modal communication method in accordance with some embodiments. As shown in FIG. 1, the communication method includes the following steps:

In step S101, the mobile terminal detects a distance between a front side of a mobile terminal and a body part of a user (e.g., a user's ear or the user's mouth), and/or a motion state of the mobile terminal. The front side of the mobile terminal refers to the display screen side of the mobile terminal.

In some embodiments, the mobile terminal detects the distance between the front side of the mobile terminal and the body part of the user through data collection by hardware (e.g., various sensors of the mobile terminal) and calculation by software (e.g., analysis of the sensor data) on the mobile terminal.

For example, in some embodiments, the mobile terminal detects the distance between the mobile terminal and the body part of the user according to the sizes of images (e.g., images of the user's head or face) acquired through the front-facing video camera of the mobile terminal. In some embodiments, the mobile terminal detects the distance by sensing heat of from a human body (e.g., the heat from the user's head or face) through the front-facing heat sensor of the mobile terminal. In some embodiments, the mobile terminal obtains the orientation, speed and movement trajectory of the mobile terminal through a gyroscope of the mobile terminal. Other sensors (e.g., proximity sensors, ambient light sensors, position sensors, touch sensors) on the mobile terminal may also be used to collect data indicative of the current positions, orientation, movement of the mobile terminal relative to the user's body (e.g., hands, ears, mouth, eyes, head, face, etc.).

In step S102, in some embodiments, when detecting result meets the pre-set speech communication conditions, the mobile terminal automatically starts the speech communication mode of the multi-modal communication function.

In accordance with some embodiments, the conditions of the speech communication are pre-set by the user. In some embodiments, the conditions include that the distance between the body part (e.g., an ear or head) of the user and the front side of the mobile terminal is less than a certain specific threshold value (e.g., 2 cm). In some embodiments, the conditions include that the distance between the body part of the user and the earpiece of the mobile terminal is less than a certain specific threshold value. In some embodiments, the conditions include that the distance between the body part (e.g., mouth or head) of the user and the microphone of the mobile terminal is less than a certain specific threshold value (e.g., 5 cm). In some embodiments, the conditions include that the motion state of the mobile terminal shows that the mobile terminal makes an upward movement (e.g., moving toward the head of the user).

As a result, the user only needs to put the mobile terminal close to the body part of the user to start a particular mode (e.g., a speech communication mode) of the multi-modal IM communication. For example, the user may put the mobile terminal next to the ear of the user to start listening playback of a voice message via an earpiece of the mobile terminal. The user may put the mobile terminal next to the mouth of the user to start recording of a voice message via a microphone of the mobile terminal. Similarly, the user may put the mobile terminal from near the user's ear to away from the user's ear to switch from an earpiece-based on playback mode to a speaker-based playback mode for playing the voice message. Similarly, the user may also put the mobile terminal from near the user's mouth to away from the user's mouth to switch from voice message recording mode to a text input mode. In some embodiments, the user may also put the mobile terminal from near the user's ear to in front of the user's face to switch from an earpiece-based on playback mode to a speech-to-text output mode (e.g., displaying a text version of the voice message). In some embodiments, the user may also put the mobile terminal to a vertical or horizontal orientation to activate a camera message mode (e.g., activating the camera to capture an image for an image message).

In some embodiments, before the step S101, the mobile terminal optionally obtains the target communication account (e.g., a conversation partner of the user in a current IM dialogue session), for example, from the current dialogue session. Thus, when the detecting result meets the pre-set speech communication conditions, the mobile terminal communicates with this obtained communication account according to the communication mode that has been selectively activated. In some embodiments, the target communication account does not need to be obtained. For example, when the detecting result meets the pre-set speech communication conditions, the mobile terminal can directly play a voice message in the mobile terminal, or directly record a voice message. In some embodiments, the mobile terminal executes the step S101 on a specific user interface, e.g., in a dialogue interface or communication record interface for the current communication session. In some embodiments, the dialogue interface or communication record interface displays each message transmitted between two or more participants of the conversation (e.g., including the user, and the user's conversation partner(s)), and indicates the sender of the message using an identifier or avatar of the message. In addition, the messages are displayed in a chronological order as they are transmitted between the participants of the conversation. In some embodiments, the dialogue interface or communication record interface displays only the messages exchanged in the current dialogue session. In some embodiments, the dialogue interface or communication record interface also displays previous messages exchanged between the participants of the current dialogue session.

It should be noted that, in some embodiments, the step S101 can be either constantly or periodically executed. In some embodiments, the step S101 is being executed when and after the step 102 is being executed.

In step S103, in some embodiments, when the detecting result does not meet the pre-set speech communication conditions, the mobile terminal terminates the speech communication. For example, in some embodiments, when the detected distance between the user's body part (e.g., the user's ear) and the front of the mobile terminal is not less than the preset threshold value, the mobile terminal stops the speech communication, and returns to text-based communication mode.

It should be noted that, the detecting results in steps S102 and S103 may be obtained in step S101 in different periods of time.

Thus, when the detecting result meets the pre-set speech communication conditions, the mobile terminal starts the speech communication, e.g., speech playing, speech recording or continuous conversation with another communication terminal. When the detecting result does not meet the pre-set speech communication conditions, the mobile terminal terminates the speech communication. As a result, the mobile terminal conducts the speech communication only in the period that the detecting result meets the pre-set speech communication conditions.

In some embodiments, the step S101 includes that the mobile terminal optionally obtains at least one image containing a facial feature of the user by recognizing the facial feature of the user through the front-facing video camera of the mobile terminal.

In some embodiments, the pre-set speech communication conditions include that a size of a facial feature (e.g., an ear or a mouth) contained in an image exceeds a pre-set size; or at least one mentioned image indicates that the user is close to the mobile terminal in a pre-set time.

In some embodiments, the facial features specifically include eyes, ears or a mouth of the user.

In some embodiments, the mobile terminal detects the distance between the facial feature of the user and the front side of the mobile terminal by analyzing images taken by the camera. When a size of a facial feature contained in an image exceeds the pre-set size; or at least one mentioned image indicates that the user is close to the mobile terminal for a pre-set length of time, the mobile terminal starts the speech communication mode.

In some embodiments, the at least one aforementioned image indicating that the user is sufficiently close to the mobile terminal for the pre-set length of time is that, for the pre-set length of time (for example, within 3 seconds), the images become bigger and bigger, even if the video camera is out of focus.

In some embodiments, the step S101 optionally includes that the mobile terminal obtains the temperature information by perceiving the heat source of the body part of the user through the front-facing heat sensor.

In some embodiments, the pre-set speech communication conditions include that the temperature indicated by the temperature information exceeds the pre-set temperature value.

Since the body temperature of the body part is relatively high, when the body part is close to the mobile terminal, the heat sensor may perceive it. And the closer of the body part to the mobile terminal, the higher of the temperature is perceived by the heat sensor. When the perceived temperature exceeds the pre-set temperature value, the mobile device concludes that the body part is very close to the front side of the mobile terminal and then to conduct the speech communication.

In some embodiments, the step S101 optionally includes that the mobile terminal detects the motion speed and/or movement trajectory of the mobile terminal through a gyroscope of the mobile terminal, so as to obtain the motion information including the motion speed and/or movement trajectory of the mobile terminal.

The pre-set speech communication conditions include that the motion information is consistent with pre-set motion values.

Specifically, in some embodiments, the pre-set motion values include a specific movement trajectory or specific motion speed. When the motion speed of the mobile terminal meets the specified motion speed, or the movement trajectory of the mobile terminal meets pre-set movement trajectory, the motion information is consistent with the motion values. For example, when a mobile terminal is put in the pocket and the user needs to use the terminal for an IM communication, the user moves the mobile terminal close to the ear or mouth. The movement trajectory of the mobile terminal in this process is consistent with a straight-up movement trajectory. The mobile device may determine that conditions are met when a straight-up movement trajectory of the mobile terminal is detected. Certainly, in a practical application, the movement trajectory conditions may be adjusted according to the user's own habits. In some embodiments, the user may adjust the motion value according to his/her habit of using the mobile terminal.

In some embodiments, the step S101 optionally includes at least one in the following: the mobile terminal obtains at least one image containing the facial feature of the user by recognizing the facial feature of the user through the front-facing video camera; the mobile terminal obtains the temperature information by perceiving the heat source of the body part of the user through the front-facing heat sensor; and the mobile terminal detects the motion speed and or movement trajectory of the mobile terminal through the gyroscope.

In some embodiments, the pre-set speech communication conditions include that the result calculated by the pre-set mathematical model with the detecting result exceeds the pre-set value of the mathematical model.

In some embodiments, the detecting result includes at least one in the following: an image containing the facial feature of the user, the temperature information and the motion information.

As a result, the mobile device integrates the multiple implementation modes, which effectively prevents inadvertent operations of the user.

In some embodiments, the step S101 optionally includes that the mobile terminal detects the distance between the earphone of the mobile terminal and the body part of the user, as well as the distance between the touch screen of the mobile terminal and the body part of the user, so as to obtain the distance information including the first distance value and the second distance value. The first mentioned distance value is used to indicate the distance between the earphone and the body part of the user. The second mentioned distance value is used to indicate the distance between the screen and the body part of the user.

In some embodiments, according to the distance information, the mobile terminal determines a first period of time during which the first distance value is less than a first pre-set distance value and the second distance value is less than a second pre-set distance value. The pre-set speech communication conditions include that the first period of time is longer than a pre-set time value.

Specifically, in some embodiments, the mobile terminal detects the distance between the earphone of the mobile terminal and the body part of the user through the front-facing video camera or the front-facing heat sensor. Constantly or periodically, the mobile terminal detects the distance between the earphone of the mobile terminal and the body part of the user as well as the distance between the touch screen of the mobile terminal and the body part of the user, in order to determine the first period of time.

When the first period of time is longer than the pre-set time value, it indicates that the time that the user keeps the answering posture is longer than the pre-set time value. The answering posture may be that the distance between the operational earphone and the body part of the user is less than the first pre-set distance and the distance between the touch screen of the mobile terminal and the body part of the user is less than the second pre-set distance. For example, the user puts the mobile terminal next to the ear, so the ear or face of the user is within a distance with the touch screen of the mobile terminal, or the ear of the user in contact with the earphone of the mobile terminal.

In some embodiments, the step S101 optionally includes that the mobile terminal detects the distance between the earphone of the mobile terminal and the body part of the user, so as to obtain a third distance value.

The mobile terminal detects whether the touch screen of the mobile terminal is in contact with the body part of the user. If so, it determines a second period of time during which the third distance value is less than the third pre-set distance value and the touch screen is in contact with a body part of the user (e.g., the face or ear of the user).

In some embodiments, the pre-set speech communication conditions include that the second period of time is longer than a pre-set time value.

Specifically, constantly or periodically, the mobile terminal detects the distance between the earphone of the mobile terminal and the body part of the user, and the mobile terminal detects whether the touch screen of the mobile terminal is in contact with the body part of the user in order to determine the second period of time. Specifically, the mobile terminal compares the time difference of the third distance value less than the third pre-set distance value under the multiple continuous time as well as the time difference that the touch screen is in contact with the body part under the multiple continuous time, so as to obtain the second period of time.

When the second period of time is longer than the pre-set time value, it indicates that the time that the user keeps the answering posture is longer than the pre-set time value. The answering posture may be that the distance between the operational earphone and the body part of the user is less than the first pre-set distance and there is a contact between the touch screen of the mobile terminal and the body part of the user. For example, the user puts the mobile terminal next to the ear, so the ear or face of the user is in contact with the touch screen of the mobile terminal, or the ear of the user is in contact with the earphone of the mobile terminal.

In some embodiments, automatically starting speech communication includes that the mobile terminal automatically starts the recording of a voice message; when the recording cannot record the voice of the user in a pre-set time range, the mobile terminal produces an alert to the user and/or abandons the recording operation.

In such way, the mobile terminal discards the voice message that does not contain the use's voice. As a result, the mobile device avoids the user inadvertently sending out an unintended voice message. For example, if the user puts the hand aside the earphone accidentally, then the mobile terminal may be likely to start a speech communication. But at this moment, the user does not speak and the mobile terminal discards the recorded message.

Optionally, after producing the alert, the mobile terminal also conducts a recording. When this recording is valid (for example, the recording includes the voice of the user), the mobile terminal sends out the recorded message; when this recording is invalid (for example, the recording includes no voice of the user), the mobile terminal discards it again. The alert may be a particular sound.

In the technical solutions described herein, when the mobile terminal determines that the detecting result meets the pre-set speech communication conditions, the mobile terminal automatically starts a particular communication mode (e.g., the speech communication mode) of a plurality of available communication modes. The user does not need to touch a key designated for starting the particular communication mode, which simplifies the operation process of the particular communication mode (e.g., the speech communication mode).

Figure 2:
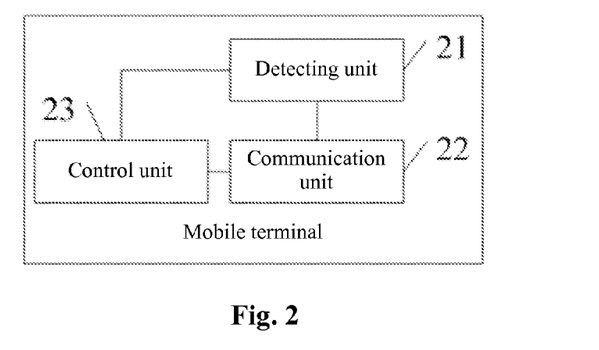
FIG. 2 is a schematic structural diagram of a device of providing multi-modal instant messaging communication in accordance with some embodiments.

FIG. 2 is the schematic diagram showing the structure of a mobile terminal in accordance with some embodiments. As shown in FIG. 2, the mobile terminal includes a detecting unit 21, a communication unit 22 and a control unit 23.

In some embodiments, the detecting unit 21 is configured to detect the distance between the front side of the mobile terminal and the body part of the user or the motion state of the mobile terminal, so as to obtain the detecting result.

In some embodiments, the detecting unit 21 detects the distance between the mobile terminal and the body part of the user through hardware device(s) on the mobile terminal. For example, it may detect the distance between the mobile terminal and the body part of the user according to the size of image acquired through a front-facing video camera of the mobile terminal. In some embodiments, it detects the distance between the mobile terminal and the body part of the user according to the perceived heat through a front-facing heat sensor of the mobile terminal. In some embodiments, it recognizes the motion state information of the mobile terminal by detecting the motion speed or movement trajectory of the mobile terminal through a 3D gyroscope of the mobile terminal.

In some embodiments, the communication unit 22 is configured to automatically start a particular communication mode (e.g., the speech communication mode) of a plurality of available communication modes, when the detecting result meets the pre-set speech communication conditions.

In accordance with some embodiments, the conditions of the speech communication may be pre-set by the user.

In some embodiments, before the detecting unit 21 executes the detecting step, the mobile terminal obtains a target communication account, for example, from the current dialogue session. Thus when the detecting result meets the pre-set speech communication conditions, the mobile terminal can communicate with this obtained communication account using the selected communication mode. In some embodiments, the target communication account does not need to be obtained. For example, when the detecting result meets the pre-set speech communication conditions, the mobile terminal can directly play a voice message in the mobile terminal, or directly record a voice message. In some embodiments, the mobile terminal executes the step S101 on a specific interface, for example, in a dialogue interface or communication record interface.

It should be noted that, in some embodiments, the detecting unit 21 may execute detecting constantly or periodically. In some embodiments, when and after the communication unit 22 conducts the speech communication, the detecting unit 21 can also execute the detecting. It should be noted that, in some embodiments, the detecting unit 21 can execute the detecting either constantly or periodically.

In some embodiments, control unit 23 is configured to terminate the selected communication mode (e.g., the speech communication mode) when the detecting result does not meet the pre-set speech communication conditions.

It should be noted that, the detecting results in the communication units 22 and control unit 23 may be obtained by the detecting unit 21 in different periods of time.

In some embodiments, the detecting unit 21 is also configured to obtain at least one image containing a facial feature of the user by recognizing the facial feature of the user through the front-facing video camera of the terminal device.

In some embodiments, the pre-set speech communication conditions include that a size of a facial feature contained in an image exceeds the pre-set size; or at least one mentioned image indicates that the user is sufficiently close (e.g., less than 2 cm) to the mobile terminal in a pre-set time.

In some embodiments, the facial features specifically include eyes, ears or a mouth.

In some embodiments, the mobile terminal detects the distance between the facial feature of the user and the front side of the mobile terminal or video camera through images taken by the video camera. When a size of a facial feature contained in an image exceeds the pre-set size; or at least one mentioned image indicates that the user is sufficiently close to the mobile terminal in the pre-set time, the mobile terminal may conduct communication in the selected communication mode (e.g., the speech communication mode).

In some embodiments, the detecting unit 21 is also configured to obtain the temperature information by perceiving the heat source of the body part of the user through the front-facing heat sensor of the mobile terminal.

In some embodiments, the pre-set speech communication conditions include that the mobile terminal obtains the temperature information by perceiving the heat source of the body part of the user through the front-facing heat sensor.

In some embodiments, the detecting unit 21 is also configured to detect the motion speed and or movement trajectory of the mobile terminal through the gyroscope, so as to obtain the motion information including the motion speed and or movement trajectory of the mobile terminal.

In some embodiments, the pre-set speech communication conditions include that the mobile terminal detects the motion speed and/or movement trajectory of the mobile terminal through a gyroscope, so as to obtain the motion information including the motion speed and/or movement trajectory of the mobile terminal.

In some embodiments, the pre-set speech communication conditions include that the motion information is consistent with the pre-set motion values.

Specifically, in some embodiments, the pre-set motion values include the specific movement trajectory or specific motion speed. When the motion information is consistent with this motion value, the motion speed of the mobile terminal meets the specified motion speed, or the movement trajectory of the mobile terminal meets pre-set conditions. For example, a mobile terminal is put in the pocket. When the user needs to use the terminal communication for an IM communication, the user moves the mobile terminal close to the ear or mouth. The movement trajectory of the mobile terminal in this process is consistent with a straight-up movement trajectory. The mobile device may determine that conditions are met when a straight-up movement trajectory is detected. Certainly, in a practical application, the movement trajectory conditions may be adjusted according to the user's own habits. In some embodiments, the user may adjust the motion value according to his/her habits of using the mobile terminal.

In some embodiments, the detecting unit 21 is also configured to obtain at least one image containing the facial feature of the user by recognizing the facial feature of the user through the front-facing video camera; the mobile terminal may obtain the temperature information by perceiving the heat source of the body part of the user through the front-facing heat sensor; and the mobile terminal detects the motion speed and or movement trajectory of the mobile terminal through the gyroscope.

In some embodiments, the pre-set speech communication conditions include that the result calculated by the pre-set mathematical model with the detecting result exceeds the pre-set value of the mathematical model.

In some embodiments, the detecting result includes at least one in the following: at least one mentioned image containing the facial feature of the user, the temperature information and the motion information.

As a result, the mobile device integrates the multiple implementation modes, which effectively prevents inadvertent operations performed by the user.

Figure 3:
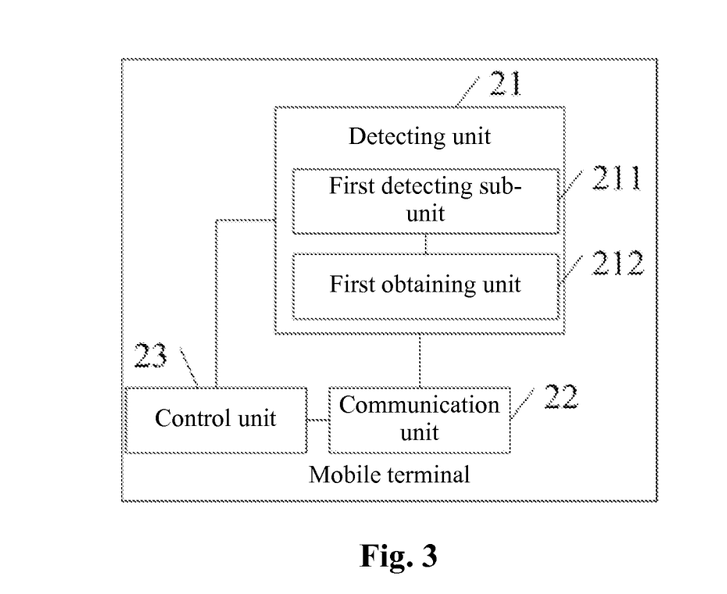
FIG. 3 is a schematic structural diagram of a device of providing multi-modal instant messaging communication in accordance with some embodiments.

In some embodiments, as shown in FIG. 3, the detecting unit 21 includes the first detecting sub-unit 211 which detects the distance between the earphone of the mobile terminal and the body part of the user, as well as the distance between the touch screen of the mobile terminal and the body part of the user, so as to obtain the distance information including a first distance value and a second distance value; the first mentioned distance value is used to indicate the distance between the earphone and the body part of the user; the second mentioned distance value is used to indicate the distance between the screen and the body part of the user.

In some embodiments, the first obtaining unit 212 is configured to, according to the distance information, determine a first period of time during which the first distance value is less than the first pre-set distance value and the second distance value is less than the second pre-set distance value. The pre-set speech communication conditions include that the first period of time is longer than a pre-set time value.

Specifically, in some embodiments, it detects the distance between the earphone of the mobile terminal and the body part of the user through the front-facing video camera or the front-facing heat sensor.

In some embodiments, when the first period of time is longer than the pre-set time value, it indicates that the time that the user keeps the answering posture is longer than the pre-set time value. The answering posture may be that the distance between the operational earphone and the body part of the user is less than the first pre-set distance and the distance between the touch screen of the mobile terminal and the body part of the user is less than the second pre-set distance. For example, the user puts the mobile terminal next to the ear, so the ear or face of the user is within a distance with the touch screen of the mobile terminal, or the ear of the user is in contact with the earphone of the mobile terminal.

Figure 4:
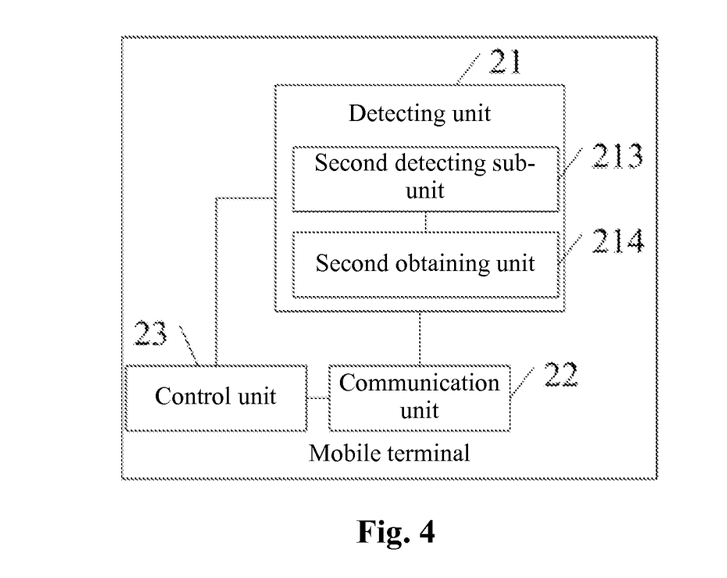
FIG. 4 is a schematic structural diagram of a device of providing multi-modal instant messaging communication in accordance with some embodiments.

In some embodiments, as shown in FIG. 4, the detecting unit 21 optionally includes: a second detecting sub-unit 213, configured to detect the distance between the earphone of the mobile terminal and the body part of the user, so as to obtain a third distance value, and a second obtaining unit 214, configured to detect whether the touch screen of the mobile terminal is in contact with the body part of the user. If in contact, the second obtaining unit 214 obtains the second period of time during which the third distance value is less than the third pre-set distance value and the touch screen is contact with a body part of the user.

In some embodiments, the pre-set speech communication conditions include that the second period of time is longer than the pre-set time value.

Specifically, in some embodiments, constantly or periodically, the mobile terminal detects the distance between the earphone of the mobile terminal and the body part of the user, and the mobile terminal detects whether the touch screen of the mobile terminal is in contact with the body part of the user in order to obtain the second period of time. Specifically, it may compare the time difference of the third distance value less than the third pre-set distance value under the multiple continuous time as well as the time difference that the touch screen is in contact with the body part under the multiple continuous time, so as to obtain the second period of time.

In some embodiments, when the second period of time is longer than the pre-set time value, it indicates that the time that the user keeps the answering posture is longer than the pre-set time value. The answering posture may be that the distance between the operational earphone and the body part of the user is less than the first pre-set distance and there is a contact between the touch screen of the mobile terminal and the body part of the user. For example, the user puts the mobile terminal next to the ear, so the ear or face of the user is in contact with the touch screen of the mobile terminal, or the ear of the user is in contact with the earphone of the mobile terminal.

As an optional implementation mode, the communication unit 22 includes a recording unit (not drawn in the attached drawing) configured to automatically start the recording of a voice message and an alert unit (not drawn in the attached drawing) configured to produce alert information and discard the recording when the recording does not record the voice of the user.

In such way, the mobile terminal discards the voice message that does not contain the use's voice. As a result, the mobile device avoids the user inadvertently sending out an unintended voice message. For example, the user puts the hand aside the earphone accidentally, then the mobile terminal may be likely to start an IM communication. But at this moment, the user does not speak and the mobile terminal discards the recorded message.

Optionally, after producing the alert, the mobile terminal also conducts a recording. When this recording is valid (for example, including the voice of the user), the mobile terminal sends out the recorded message; when this recording is invalid (for example, including no voice of the user), the mobile terminal discards it again. The alert may be a sound alert.

In the technical solutions described herein, when the mobile terminal determines that the detecting result meets the pre-set speech communication conditions, the mobile terminal automatically starts a particular communication mode (e.g., the speech communication mode) among a plurality of available communication modes. The user does not need to touch a key designated to start the particular communication mode, which simplifies the operation process of the particular communication mode (e.g., the speech communication mode).

Figure 5:
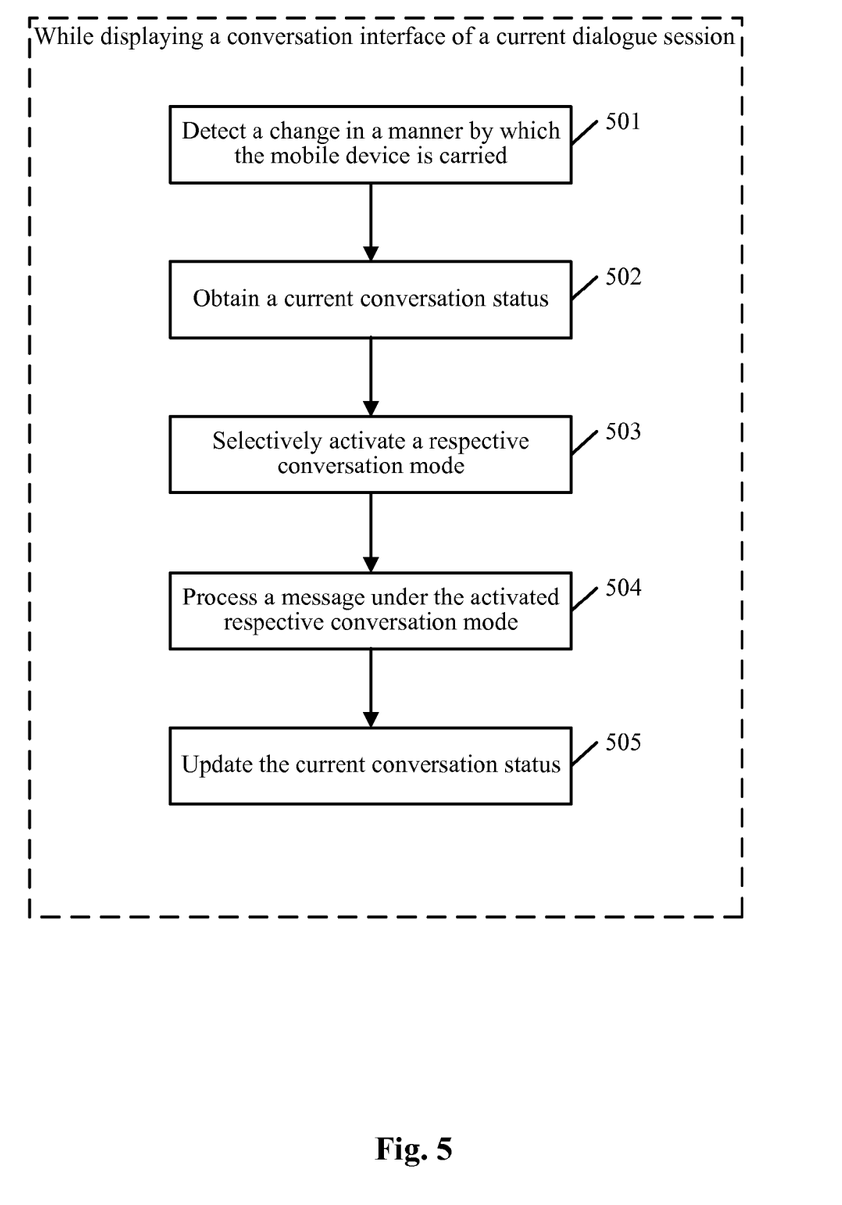
FIG. 5 is a flowchart of providing multi-modal instant messaging communication in accordance with some embodiments.

FIG. 5 is a flowchart of providing multi-modal instant messaging communication in accordance with some embodiments. The method is performed at a mobile device having one or more processors and memory storing instructions for execution by the one or more processors. In addition, the method is performed while the device is displaying a conversation interface of a current dialogue session of an instant messaging application between a user of the mobile device and the user's conversation partner. The mobile device described herein can be a mobile terminal described above.

An instant messaging application is an application that provides real-time text transmission and may feature other services, including real-time voice message transmission, real-time video message transmission, voice conversation, video conversation, multi-party conference call, image transmission, etc. Notably, the transmissions are from one user of the application to one or more other users of the application and are mainly through the Internet. The instant messaging application is one example of a multi-modal communication application. In some embodiments, the multi-modal communication application optionally includes communications in an online chat room, communications through a chat interface of a multi-player game, or voice-over-IP communication application, etc.

In some embodiments, in step 501, the mobile device detects a change in a manner by which the mobile device is carried by the user. Manners by which the mobile device is carried by the user include placing the mobile device on a support surface (e.g., a table, a holder), placing the mobile device near or away from a body part (e.g., head, face, ear, mouth, eye, etc.), holding the mobile device by hand, holding the mobile device between a head and a shoulder, placing it in a pocket or a bag, and so on.

The mobile device can implement various ways of detecting the change. In some embodiments, the mobile device is embedded with a camera and starts the camera when the current dialogue session starts. The camera takes photos of a body part, e.g., an ear, of the user. By comparing the size of the ear in the photos, the mobile device calculates the distance from the mobile device to the ear. Therefore, the mobile device is configured to determine whether the mobile device is moved to the proximity of or away from a body part of the user through the camera.

In some embodiments, the mobile device is embedded with an infra-red ray detector. The mobile device activates the infra-red ray detector when starting the instant messaging application or a dialogue session. The intensity of the infra-red rays can be used to analyze the distance from the mobile device to an object emitting heat, such as a human body. By detecting the infra-red rays from the human body, the mobile device is configured to detect the distance from the mobile device to a body part of the user, e.g., her head, mouth or ear.

In some embodiments, the mobile device is embedded with a 3D gyroscope. The mobile device is configured to detect the orientation and position of the mobile device through the gyroscope. For example, the mobile device is configured to detect movement trajectory of the mobile device relative to the head of the user with the help of the gyroscope. For another example, the mobile device is configured to detect the angel between the screen of the mobile device and the horizontal line.

Some other details of detecting the change of manners are discussed in the accompanying text of FIG. 1.

In some embodiments, the mobile device is configured to detect the position, orientation, movement, and distance to the user by using a combination of a camera, an infra-red ray detector, a gyroscope and other devices and/or functions.

In accordance with some embodiments, the mobile device is configured to detect a group of changes of manners in a manner by which the mobile device is carried by the user.

The group of changes includes the user moving the mobile device to the proximity of or away from an ear of the user, the user moving the mobile device to the proximity of or away from a mouth of the user, the user moving the mobile device to a vertical or horizontal position away from a head of the user, the user moving the mobile device away from a head of the user, the user placing the mobile device into a pocket, the user holding the mobile device between a head and a shoulder, the user putting the mobile device on a table, and so on. The changes of manners to be carried of the mobile device are not limited to those illustrated above.

In step 502, in response to detecting the change, the mobile device obtains a current conversation status of the current dialogue session.

Figure 6:
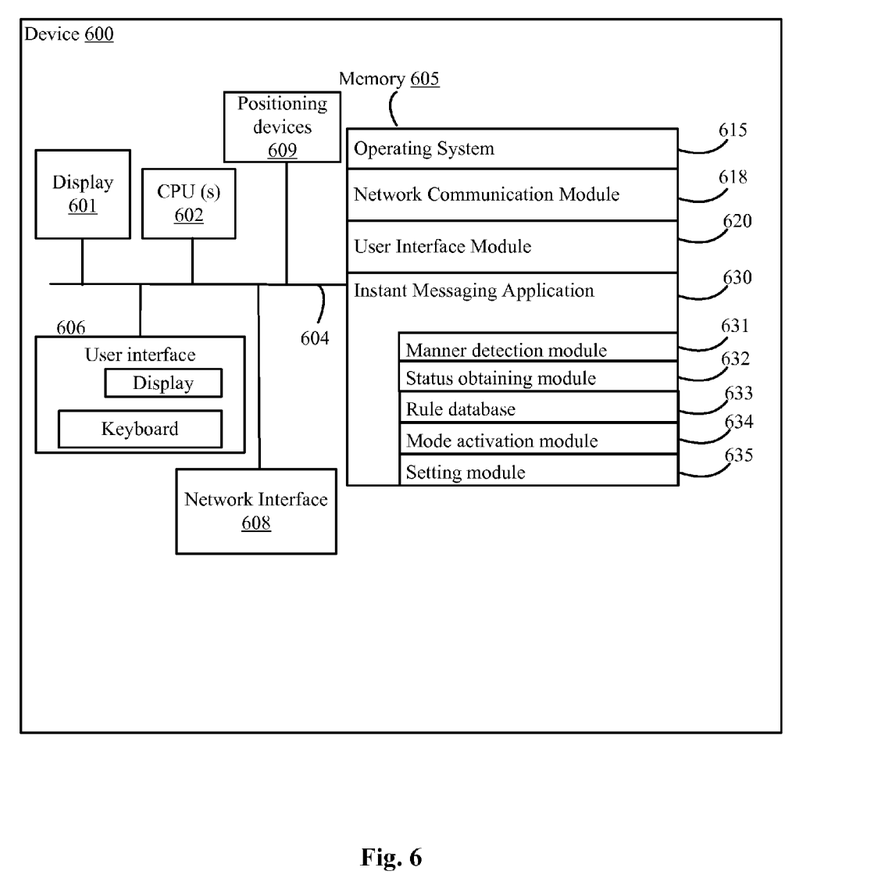
FIG. 6 is a schematic structural diagram of a device of providing multi-modal instant messaging communication in accordance with some embodiments.

In accordance with some embodiments, the mobile device stores a group of changes that may trigger step 502 in a database, e.g., a rule database 633 illustrated in FIG. 6.

In accordance with some embodiments, the conversation status can embody various records, progress and activities happened in the dialogue session between the user and the user's conversation partner. In some embodiments, the conversation status includes whether a last message in the current dialogue session is a voice message. In some embodiments, the conversation status includes whether a last-received voice message has been played. In some embodiments, the conversation status includes whether a voice message is being played back in a speaker-based output mode or earpiece-based output mode. In some embodiments, the conversation status includes whether the user has just entered a partially completed text message by a typing input mode. In some embodiments, the conversation status includes whether the user has invoked a mode-selection interface of the current dialogue session (e.g., an interface showing respective buttons for selecting a photo message mode, a camera message mode, a voice call mode, a video call mode, etc.). In some embodiments, the conversation status includes whether a text message has been selected by the user. In some embodiments, the conversation status includes whether a voice message or a text message has been selected by the user. In some embodiments, the conversation status includes whether the user has begun to enter or has entered a partially completed text message. Other conversation statuses are possible in various embodiments.

In some embodiments, in step 503, in accordance with predetermined rules based on the current conversation status and the detected change, the mobile device selectively activates a respective conversation mode of a plurality of conversation modes available to the current dialogue session.

In some embodiments, the plurality of conversation modes available to the current dialogue session includes at least two of a group of modes including a voice message recording mode, a speaker-based voice message playback mode, an earpiece-based voice message playing mode, a typing input mode, a dictation input mode, a speech-to-text output mode, a text-to-speech output mode, a camera message mode, a voice call mode, a video call mode, a conference call mode, a video chat mode, an audio conversation mode, and so on.

In some embodiments, in accordance with a determination that the detected change indicates that the user has moved the mobile device toward an ear of the user, and that the current conversation status of the current dialogue session indicates that a last received message in the current dialogue session is a voice message, automatically, without user intervention, the mobile device plays back the voice message using an earpiece of the mobile device. In some embodiments, only if the current conversation status indicates that the last received voice message has not been played, the mobile device plays the voice message.

In some embodiments, in accordance with a determination that the detected change indicates that the user has moved the mobile device toward an ear of the user, and that the current conversation status of the current dialogue session indicates that a voice message in the current dialogue session is being played via a speaker of the mobile device, automatically, without user intervention, the mobile device plays back the voice message using an earpiece of the mobile device. In some embodiments, the volume of the voice message gradually decreases while the mobile device is moving closer the ear of the user.

In some embodiments, in accordance with a determination that the detected change indicates that the user has moved the mobile device toward an mouth of the user, and that the current conversation status of the current dialogue session indicates that the user has entered a partially completed text message, automatically, without user intervention, the mobile device activates a dictation input mode for the current dialogue session. In the dictation input mode, the mobile device receives the voice of user, converts voice into text and inputs the text into the text message.

In some embodiments, in accordance with a determination that the detected change indicates that the user has moved the mobile device toward an mouth of the user, and that the current conversation status of the current dialogue session indicates that no text message inputting interface is present in the dialogue session, automatically, without user intervention, the mobile device activates a voice recording mode for the current dialogue session. In the voice recording mode, the mobile device records the voice of user and creates a voice message which is ready to be sent to the user's conversation partner.

In some embodiments, in accordance with a determination that the detected change indicates that the user has moved the mobile device away from the mouth, and that the current conversation status of the current dialogue session indicates that the mobile device is currently in dictation input mode, automatically, without user intervention, the mobile device activates a typing input mode for the current dialogue session. When the mobile device is in the typing input mode, the user touches the mobile device, e.g., by selecting each letter in a keyboard displayed in a touch screen, to input text.

In some embodiments, in accordance with a determination that the detected change indicates that the user has moved the mobile device to a vertical or horizontal position away from a head of the user, and that the current conversation status of the current dialogue session indicates that the user has entered a partially completed text message or has entered a completed text message, automatically, without user intervention, the mobile device activates a camera message mode for the current dialogue session. In some embodiments, the current conversation status further includes that an icon in the interface, e.g., a "+" button, has been selected by the user. When the camera message mode is activated, the camera is automatically activated and the user can take a picture, which is to be included in the partially completed or completed text message.

In some embodiments, in accordance with a determination that the detected change indicates that the user has moved the mobile device toward an ear of the user, and that the current conversation status of the current dialogue session indicates that a text message is selected by the user, automatically, without user intervention, the mobile device activates a text-to-speech output mode. In the text-to-speech output mode, the mobile device converts the selected message into voice and plays the voice.

In some embodiments, a corresponding relationship between a change and a conversation mode based on a certain conversation status is configured to be changed by a user. For example, a user does not like to use camera message mode. The user can remove the camera message mode from the available plurality of conversation modes. As a result, a detected change that originally activates the camera message mode activates another conversation mode or no conversation mode at all.

In some embodiments, in step 504, the mobile device processes a message under the activated respective conversation mode. Processing a message can be playing, converting, recording, sending, receiving or inputting a message, or processing the message in any other way permitted in the respective conversation mode.

In step 505, the mobile device updates the current conversation status. Since a message has been processed in the step 504, the conversation status is changed and needs to be updated. In some embodiments, the updating of the current conversation status is displayed to the user. For example, a received voice message is displayed as an icon of speaker. When the message has not been played, it is displayed as red. After the voice message has been played, it is displayed as green.

In accordance with some embodiments, the mobile device creates a visual or audio alert for updating the conversation status. For example, when a voice message has been recorded, a particular sound is produced to remind the user.

In accordance with some embodiments, under different conversation modes, the mobile device created different alerts. For example, for the same updating of sending a voice message, a particular alert sound is delivered through a speaker under a speaker-based voice message playback mode but through an earpiece under an earpiece-based voice message playback mode. For another example, when receiving a new message, the mobile device emits intermittent light when in typing input mode but delivers a reminder sound when in dictation input mode.

FIG. 6 is a diagram of an example implementation of 600 in accordance with some embodiments. In some embodiments, the device 600 includes one or more processing units (CPU's) 602, one or more network or other communications interfaces 608, a display 601, memory 605, positioning devices 609, and one or more communication buses 604 for interconnecting these and various other components. The positioning devices 609 include various sensors and peripheral devices for detecting a change in the manner that the mobile device is held by the user, e.g., including a camera, a gyroscope, and/or an infra-red ray detector. The communication buses may include circuitry (sometimes called a chipset) that interconnects and controls communications between system components. The memory 605 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 605 may optionally include one or more storage devices remotely located from the CPU(s) 602. The memory 605, including the non-volatile and volatile memory device(s) within the memory 605, comprises a non-transitory computer readable storage medium.

In some implementations, the memory 605 or the non-transitory computer readable storage medium of the memory 605 stores the following programs, modules and data structures, or a subset thereof including an operating system 615, a network communication module 618, a user interface module 620, and a multi-modal communication application 630 (e.g., an instant messaging application).

The operating system 615 includes procedures for handling various basic system services and for performing hardware dependent tasks.

The network communication module 618 facilitates communication with other devices via the one or more communication network interfaces 608 (wired or wireless) and one or more communication networks, such as the Internet, other wide area networks, local area networks, metropolitan area networks, and so on.

The user interface module 620 is configured to receive user inputs through the user interface 606.

The multi-modal communication application 630 is configured to provide multi-modal instant messaging communication to the user of device 600. Multi-modal instant messaging communication includes sending and receiving, text, image, photo, audio and video messages. Besides other modules, the multi-modal communication application 630 comprises a manner detection module 631, a status obtaining module 632, a rule database 633, a mode activation module 634 and a setting module 635.

In some embodiments, the manner detection module 631 is configured to detect a change in a manner by which the mobile device is carried by the user. In some embodiments, the manner detection module 631 is configured to receive information from the positioning devices 609 and calculate the position and orientation of the mobile device relative to the user or a particular body part of the user.

The status obtaining module 632 is configured to obtain a current conversation status of the current dialogue session.

The rule database 633 is configured to store the predetermined rules that govern the corresponding relationships among the conversation modes, the detected changes and the conversation status.

The mode activation module 634 is configured to selectively activate a particular conversation mode among a plurality of available conversation modes (also referred to as communication modes). Activating a conversation mode includes switching from one conversation mode to another.

The setting module 635 is configured to receive the setting instructions from the user and, in accordance with the instructions, to modify the rules that stored in the rule database 633.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of providing multi-modal instant messaging communication, comprising:
   at a mobile device having one or more processors and memory for storing one or more programs to be executed by the one or more processors:
   while displaying a conversation interface of a current dialogue session between a user of the mobile device and the user's conversation partner:

detecting a change in a manner by which the mobile device is carried by the user, wherein the change indicates that the user moves the mobile device to a proximity of an ear of the user;

in response to detecting the change:

obtaining a current conversation status dependent on a last message of the current dialogue session; and in accordance with predetermined rules based on the current conversation status and the detected change, selectively activating a respective conversation mode of a plurality of conversation modes available to the current dialogue session, wherein the activated respective conversation mode is a speech communication mode;

processing a message under the activated respective conversation mode, further including:

automatically, without user intervention, starting recording the message from the user;

producing an alert at the end of the recording when the recording reaches a pre-set time range and determining whether the recorded message includes the user's voice or not;

automatically sending the message to the user's conversation partner when the message includes the user's voice; and discarding the message when the message does not include the user's voice; and updating the current conversation status of the current dialogue session in accordance with the recorded message.

2. The method of claim 1, wherein the conversation status includes whether a last message in the current dialogue session is a voice message.

3. The method of claim 1, wherein the conversation status includes whether a last-received voice message has been played.

4. The method of claim 1, wherein the conversation status includes whether the user has entered a partially completed text message by a typing input mode.

5. The method of claim 1, wherein detecting the change in the manner by which the mobile device is carried by the user further comprises:

detecting the user moving the mobile device to the proximity of the ear of the user.

6. The method of claim 1, wherein detecting the change in the manner by which the mobile device is carried by the user further comprises:

detecting the user moving the mobile device to the proximity of a mouth of the user.

7. The method of claim 1, wherein detecting the change in the manner by which the mobile device is carried by the user further comprises:

detecting the user moving the mobile device to a vertical or horizontal position away from a head of the user.

8. The method of claim 1, wherein the plurality of conversation modes available to the current dialogue session includes at least two of a group of modes including a voice message recording mode, a speaker-based voice message playback mode, an earpiece-based voice message playing mode, a typing input mode, a dictation input mode, a speech-to-text output mode, a text-to-speech output mode, a camera message mode, a voice-call mode, and a video call mode.

9. The method of claim 1, wherein in accordance with predetermined rules based on the current conversation status and the detected change, selectively activating a respective conversation mode of a plurality of conversation mode available to the current dialogue session further comprises:

in accordance with a determination that the detected change indicates that the user has moved the mobile device toward the ear of the user, and that the current conversation status of the current dialogue session indicates that a last received message in the current dialogue session is a voice message, automatically, without user intervention, playing back the voice message using an earpiece of the mobile device.

10. The method of claim 1, wherein in accordance with predetermined rules based on the current conversation status and the detected change, selectively activating a respective conversation mode of a plurality of conversation mode available to the current dialogue session further comprises:

in accordance with a determination that the detected change indicates that the user has moved the mobile device away from the ear of the user, and that the current conversation status of the current dialogue session indicates that a voice message in the current dialogue session is being played via a speaker of the mobile device, automatically, without user intervention, playing back the voice message using an earpiece of the mobile device.

11. The method of claim 1, wherein in accordance with predetermined rules based on the current conversation status and the detected change, selectively activating a respective conversation mode of a plurality of conversation mode available to the current dialogue session further comprises:

in accordance with a determination that the detected change indicates that the user has moved the mobile device toward an mouth of the user, and that the current conversation status of the current dialogue session indicates that the user has entered a partially completed text message by a typing input mode, automatically, without user intervention, activating a dictation input mode for the current dialogue session.

12. The method of claim 1, wherein in accordance with predetermined rules based on the current conversation status and the detected change, selectively activating a respective conversation mode of a plurality of conversation mode available to the current dialogue session further comprises:

in accordance with a determination that the detected change indicates that the user has moved the mobile device to the proximity of the ear of the user, and that the current conversation status of the current dialogue session indicates that the user has selected a text message, automatically, without user intervention, converting the selected text message into a voice message and playing the converted voice message.

13. A device providing multi-modal instant messaging communication, comprising:

one or more processors; memory; and one or more program modules stored in the memory and configured for execution by the one or more processors, the one or more program modules including instructions for:

while displaying a conversation interface of a current dialogue session between a user of the mobile device and the user's conversation partner:

detecting a change in a manner by which the mobile device is carried by the user, wherein the change indicates that the user moves the mobile device to a proximity of an ear of the user;

in response to detecting the change:

obtaining a current conversation status dependent on a last message of the current dialogue session; and in accordance with predetermined rules based on the current conversation status and the detected change, selectively activating a respective conversation mode of a plurality of conversation modes available to the current dialogue session, wherein the activated respective conversation mode is a speech communication mode;

processing a message under the activated respective conversation mode, further including:

automatically, without user intervention, starting recording the message from the user;

producing an alert at the end of the recording when the recording reaches a pre-set time range and determining whether the recorded message includes the user's voice or not;

automatically sending the message to the user's conversation partner when the message includes the user's voice; and discarding the message when the message does not include the user's voice; and updating the current conversation status of the current dialogue session in accordance with the recorded message.

14. The device of claim 13, wherein the conversation status includes whether a last message in the current dialogue session is a voice message.

15. The device of claim 13, wherein the conversation status includes whether a last-received voice message has been played.

16. The device of claim 13, wherein detecting the change in the manner by which the mobile device is carried by the user further comprises:

detecting the user moving the mobile device to the proximity of a mouth of the user.

17. The device of claim 13, wherein detecting the change in the manner by which the mobile device is carried by the user further comprises:

detecting the user moving the mobile device to a vertical or horizontal position away from a head of the user.

18. The device of claim 13, wherein the plurality of conversation modes available to the current dialogue session includes at least two of a group of modes including a voice message recording mode, a speaker-based voice message playback mode, an earpiece-based voice message playing mode, a typing input mode, a dictation input mode, a speech-to-text output mode, a text-to-speech output mode, a camera message mode, a voice-call mode, and a video call mode.

19. The device of claim 13, wherein in accordance with predetermined rules based on the current conversation status and the detected change, selectively activating a respective conversation mode of a plurality of conversation mode available to the current dialogue session further comprises:

in accordance with a determination that the detected change indicates that the user has moved the mobile device toward the ear of the user, and that the current conversation status of the current dialogue session indicates that a last received message in the current dialogue session is a voice message, automatically, without user intervention, playing back the voice message using an earpiece of the mobile device.

20. A non-transitory computer readable storage medium, storing one or more programs for execution by one or more processors of a computer system, the one or more programs including instructions for:

while displaying a conversation interface of a current dialogue session between a user of the mobile device and the user's conversation partner:

detecting a change in a manner by which the mobile device is carried by the user, wherein the change indicates that the user moves the mobile device to a proximity of an ear of the user;

in response to detecting the change:

obtaining a current conversation status dependent on a last message of the current dialogue session; and in accordance with predetermined rules based on the current conversation status and the detected change, selectively activating a respective conversation mode of a plurality of conversation modes available to the current dialogue session, wherein the activated respective conversation mode is a speech communication mode;

processing a message under the activated respective conversation mode, further including:

automatically, without user intervention, starting recording the message from the user;

producing an alert at the end of the recording when the recording reaches a pre-set time range and determining whether the recorded message includes the user's voice or not;

automatically sending the message to the user's conversation partner when the message includes the user's voice; and discarding the message when the message does not include the user's voice; and updating the current conversation status of the current dialogue session in accordance with the recorded message.

* * * * *